United States Patent
Rozas et al.

(10) Patent No.: US 7,725,656 B1
(45) Date of Patent: May 25, 2010

(54) BRAIDED SET ASSOCIATIVE CACHING TECHNIQUES

(76) Inventors: Guillermo Rozas, 104 Magneson Ter., Los Gatos, CA (US) 95032; Alexander Klaiber, 231 Sierra Vista Ave., Mountain View, CA (US) 94043; Robert P. Masleid, 17266 Eaton La., Monte Sereno, CA (US) 95930; John Banning, 808 Ticonderoga Dr., Sunnyvale, CA (US) 94087; James Van Zoeren, 151 S. Bernardo Ave., #18, Sunnyvale, CA (US) 94086; Paul Serris, 16046 Alta Vista Way, San Jose, CA (US) 95127

(*) Notice: Subject to any disclaimer, the term of this patent is extended or adjusted under 35 U.S.C. 154(b) by 674 days.

(21) Appl. No.: 11/583,463

(22) Filed: Oct. 18, 2006

(51) Int. Cl.
*G06F 13/00* (2006.01)

(52) U.S. Cl. .................. 711/128; 711/140; 711/144; 711/145

(58) Field of Classification Search .......... 711/128, 711/140, 144, 145
See application file for complete search history.

(56) References Cited

U.S. PATENT DOCUMENTS

| | | | |
|---|---|---|---|
| 4,577,293 A * | 3/1986 | Matick et al. | 365/189.04 |
| 5,353,420 A | 10/1994 | Zaidi | |
| 5,548,739 A * | 8/1996 | Yung | 711/204 |
| 5,596,735 A | 1/1997 | Hervin | |
| 5,734,858 A | 3/1998 | Patrick | |
| 5,787,495 A | 7/1998 | Henry | |
| 5,826,052 A * | 10/1998 | Stiles et al. | 712/205 |
| 5,864,877 A | 1/1999 | Henry | |
| 6,105,125 A | 8/2000 | Nemirovsky | |
| 6,216,200 B1 * | 4/2001 | Yeager | 711/100 |
| 6,314,509 B1 | 11/2001 | Tremblay | |
| 6,349,380 B1 | 2/2002 | Shahidzadeh | |
| 6,457,115 B1 | 9/2002 | McGrath | |
| 6,463,517 B1 | 10/2002 | McGrath | |
| 6,535,959 B1 * | 3/2003 | Ramprasad et al. | 711/125 |
| 6,963,823 B1 * | 11/2005 | Abraham et al. | 703/2 |
| 6,976,117 B2 | 12/2005 | Clark | |
| 7,124,286 B2 | 10/2006 | McGrath | |

OTHER PUBLICATIONS

A Case for Direct-Mapped Caches; Hill et al.; IEEE; 1988; Dec. 1988; pp. 25-40.

* cited by examiner

*Primary Examiner*—Reba I Elmore

(57) ABSTRACT

A method and apparatus for storing and retrieving data in an N-way set associative cache with N data array banks is disclosed. On a cache fill corresponding to a particular way, a portion of each cache line (called a chunk) is placed in each data array bank. On a processor load seeking a requested chunk, a candidate chunk is retrieved from each data array bank and the requested chunk is selected from among the candidates.

27 Claims, 10 Drawing Sheets

BRAIDED SET ASSOCIATIVE CACHING TECHNIQUES

BACKGROUND OF THE INVENTION

This invention is related to the field of caches used in computer systems. In particular, this invention is related to the internal organization of an N-way set associative caches where N is a power of two.

SUMMARY OF THE INVENTION

The present invention provides a cache data organization for an N-way set associative cache with N data array banks that provides for efficient fills and evictions of cache lines as well as providing timely access to the data on a processor load.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1A:
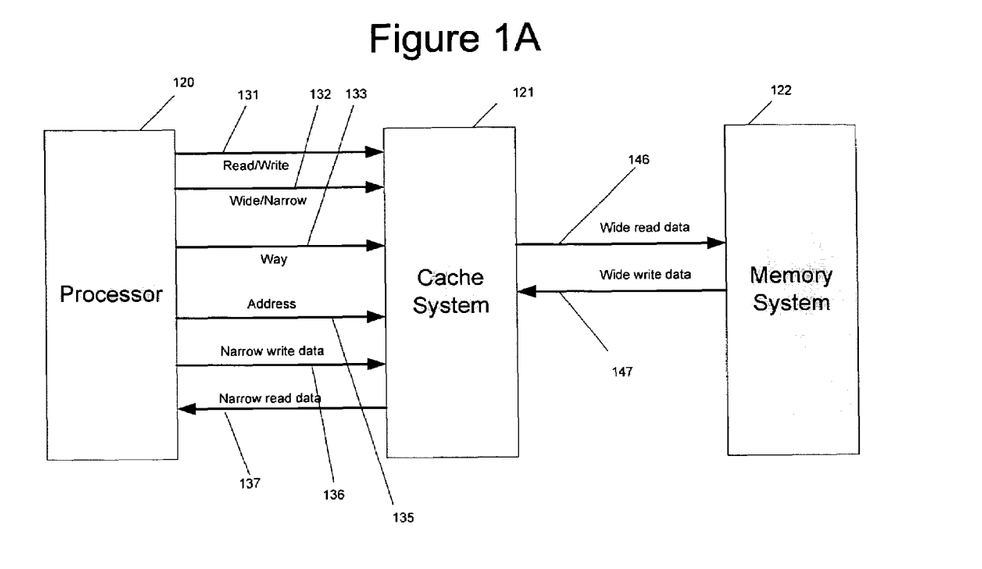
FIG. 1A illustrates one embodiment of the relationship between a processor, a cache system embodying the present invention and a memory system.

FIG. 1A shows a cache system 121 embodying the present invention in relation to a processor 120 and a memory system 122. The system of FIG. 1A may be utilized in personal computers, server computers, client computers, laptop computers, hand-held devices, minicomputers, mainframe computers, distributed computer systems and the like. Cache system 121 and memory system 122 together form a hierarchical memory system for processor 120. Cache system 121 is an N-way set associative cache where N is a power of 2. For convenience in notation in this description, N will refer to the degree of the set associative cache and will be equal to $2^h$. Thus, N can be represented with h bits.

To operate the present invention, the processor provides control signals that include a read/write signal 131, a wide/narrow signal 132 and a way signal 133. The processor 120 generates an address that uses address path 135. The processor 120 can store data in the cache system 121 via the narrow write data path 136 or load data from the cache system 121 via the narrow read data path 137 from the cache system 121. The cache system 121 can send eviction data to the memory system 122 via the wide read data path 146 or receive fill data from the memory system 122 via the wide write data path 147. There are additional control signals and data paths associated with a conventional hierarchical memory system that includes an N-way set associative cache, and those additional signals and data paths are used in accordance with the conventional teaching.

The width of the wide read data path 146 and the wide write data path 147 are the same, and the width of the narrow write data path 136 and the narrow read data path 137 are the same. However, the wide data width is a multiple of the narrow width. In one embodiment, that multiple is N. The basic unit of storage in the cache system 121 corresponds to the width of the narrow write data 136, and is called a "chunk". The unit of storage between the cache system 121 and memory system 122 is called a "cache line" and represents the width of the wide write data 147 or wide read data 146. In one embodiment, the chunk would be 8 bytes, and the cache line would be 32 bytes.

Figure 1B:
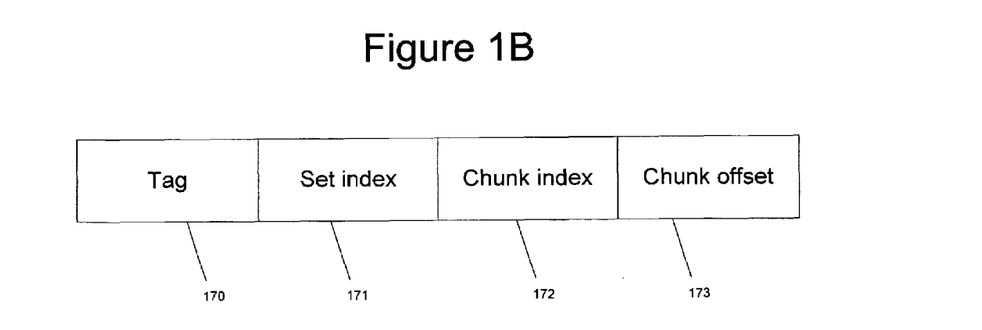
FIG. 1B shows an exemplary address in accordance with the present invention.

FIG. 1B shows the address divided into several parts namely a tag 170, a set index 171, a chunk index 172 and a chunk offset 173. The chunk offset 173 would be used to select a particular byte within a chunk or identify the starting point of a multiple byte access. Because the chunk is the basic unit of data communicated between the processor 120 and the cache system 121, the cache system 121 would not need the chunk offset 173. The processor 120 would be also be responsible for managing misaligned operations and only sending aligned loads and stores to the cache system 121. The chunk index 172 would have h bits, where h is defined above. In one embodiment, the address has 64 bits in total with 3 bits for the chunk offset, 2 bits for the chunk index, 7 bits for the set index and 52 bits for the tag.

In general terms, a narrow write (a store operation) is performed with the processor 120 sending the cache system 121 a chunk to be stored along with an address and a way. The cache system 121 places the chunk into storage and retains information about the set index and tag to facilitate later retrieval. A narrow read, or load operation, is performed by the processor 120 sending cache system 121 an address. The cache system 121 then uses the set index, the tag, the chunk index, and retained address information to determine whether the target chunk is actually present, and if it is, determine the 'way' that it is stored and retrieve the target chunk.

In general terms, a wide write (or cache line fill) is performed by the processor 120 specifying an address to the memory system 122 and the cache system 121 and a way to the cache system 121. The memory system 122 retrieves all of the chunks associated with the tag and set index portion of the address. The cache system 121 stores all of those chunks and retains tag and set index information to facilitate retrieval. Similarly, a wide read (or cache line eviction) is performed by the processor 120 specifying an address and a way, and the cache system 121 retrieving all of the chunks associated with that way and the specified tag and set index.

Figure 2:
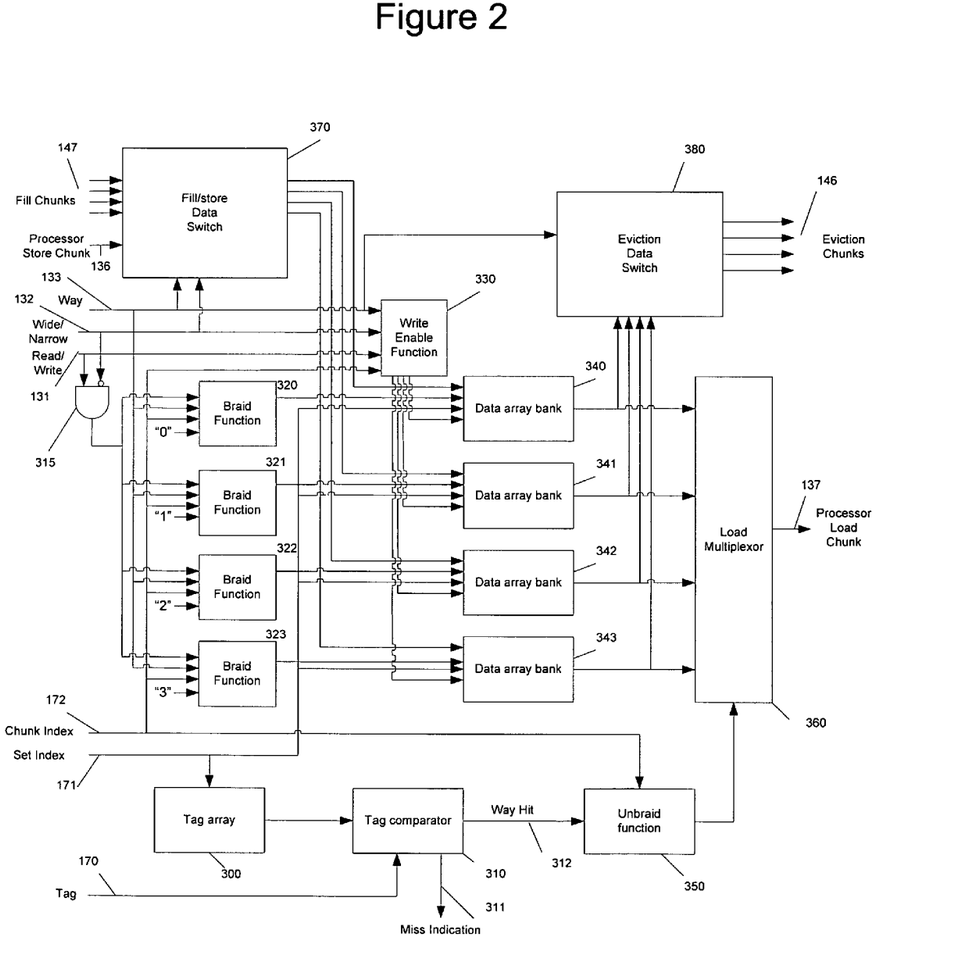
FIG. 2 shows a block diagram of an embodiment of a 4-way set associative cache in accordance with the present invention.

FIG. 2 shows an exemplary embodiment cache system 121. In particular, the embodiment of FIG. 2 shows a 4-way set associative cache with 4 chunks per cache line. The techniques shown for the 4-way set associative cache can be readily generalized to an N-way set associative cache.

Cache system 121 has elements found in a conventional 4-way set associative cache, namely four data array banks 340, 341, 342 and 343, tag array 300, tag comparator 310, load multiplexor 360 and miss indication signal 311. Cache system 121 also has additional logic functions, namely write enable function 330, narrow read (load) detect function 315, braid functions 320, 321, 322 and 323, unbraid function 350, fill/load data switch 370 and eviction data switch 380.

Each data array bank 340, 341, 342, 343 is memory that reads or writes a single chunk at a specific address depending on the value of its control inputs. The control inputs are an address, a write enable signal and a data input. In this embodiment, the address of a particular data array bank is the concatenation of the set index 171 with the output of the corresponding braid function. The data array bank may be multi-ported or single ported. The data array bank may be static RAM or dynamic RAM or any other suitable memory technology.

As in a conventional N-way set associative cache, tag array 300 and tag comparator 310 use the tag 170 and the set index 171 for a load to produce a way hit 312 and a miss indication signal 311. The miss indication signal 311 indicates that the target chunk is not in the cache. The way hit 312 identifies the way associated with the target chunk. The operation and structure of the tag array 300, tag comparator 310 and the handling of cache misses is done in a conventional manner for an N-way set associative cache.

The load multiplexor 360 is used to select the target chunk from one of data banks 340, 341, 342 or 343 using the result of the unbraid function 350 which operates on the chunk index 172 and the way hit 312. In a conventional N-way set associative cache, the load multiplexor 360 would use the way hit 312 as the selection input.

The write enable function 330 takes as inputs the way 133, the wide/narrow signal 132, the read/write signal 131 and the chunk index 172 and produces a write enable signal for each data array bank 340, 341, 342 and 343.

The narrow read function 315 determines if the current operation is a processor load. In one embodiment the read/write signal 131 is encoded with a "1" for read and the wide/narrow signal is encoded with at a "1" for a wide operation, and thus function 315 would be the single gate shown in FIG. 2.

For a wide write (fill), the fill/store data switch 370 permutes the chunks from the wide write (fill) cache line to get to the appropriate data array bank 340, 341, 342, 343 depending on the way 133 for the current operation. On a narrow write (store), the fill/store data switch provides a copy of the store chunk to each data array bank input 340, 341, 342, 343.

Eviction data switch 380 puts the chunks from the data array banks 340, 341, 342, 343 back into the correct sequence for storage in the memory system 122 during a wide read operation.

The braid functions 320, 321, 322 and 323 and the unbraid function 350 are used to 'permute' and 'unpermute' chunks and ways in the data array bank. In general terms, braid functions and the unbraid function shuffle the way and chunk index bits (i) to distribute the chunks belonging to a particular way across each data array bank and (ii) to put the chunks with the same chunk index value but belonging to different ways in different data array banks. The details of the braid function will be described later. A braid function has a bank index input, a way input, a chunk index input and a narrow read (load) operation input and it produces an output that is used as an address. The narrow read operation input indication is used to distinguish between a narrow read and the other operations (narrow write, wide write, wide read). Note that the way input, the chunk index input and the bank index input and the braid function output each have h bits. The bank index input is typically 'hardwired' to a constant in a circuit implementation. In FIG. 2, braid function 320 has bank index input hardwired to "0", braid function 321 has the bank index input hardwired to "1", braid function 322 has the bank index input hardwired to "2" and braid function 323 has the bank index input hardwired to "3". The unbraid function 350 has a way hit input and a chunk index input and it produces a bank index as output.

In one embodiment, unbraid(way_hit,chunk_index)=way_hit^chunk_index where "^" indicates bitwise exclusive or. In such an embodiment, braid(bank_index, chunk_index, way, 1)=chunk_index.

That is, on narrow reads, the braid function passes the chunk_index through.

However, for all other operations (narrow writes, wide writes, and wide reads), braid(bank_index, chunk_index, way, 0)=way^bank_index.

Figure 6:
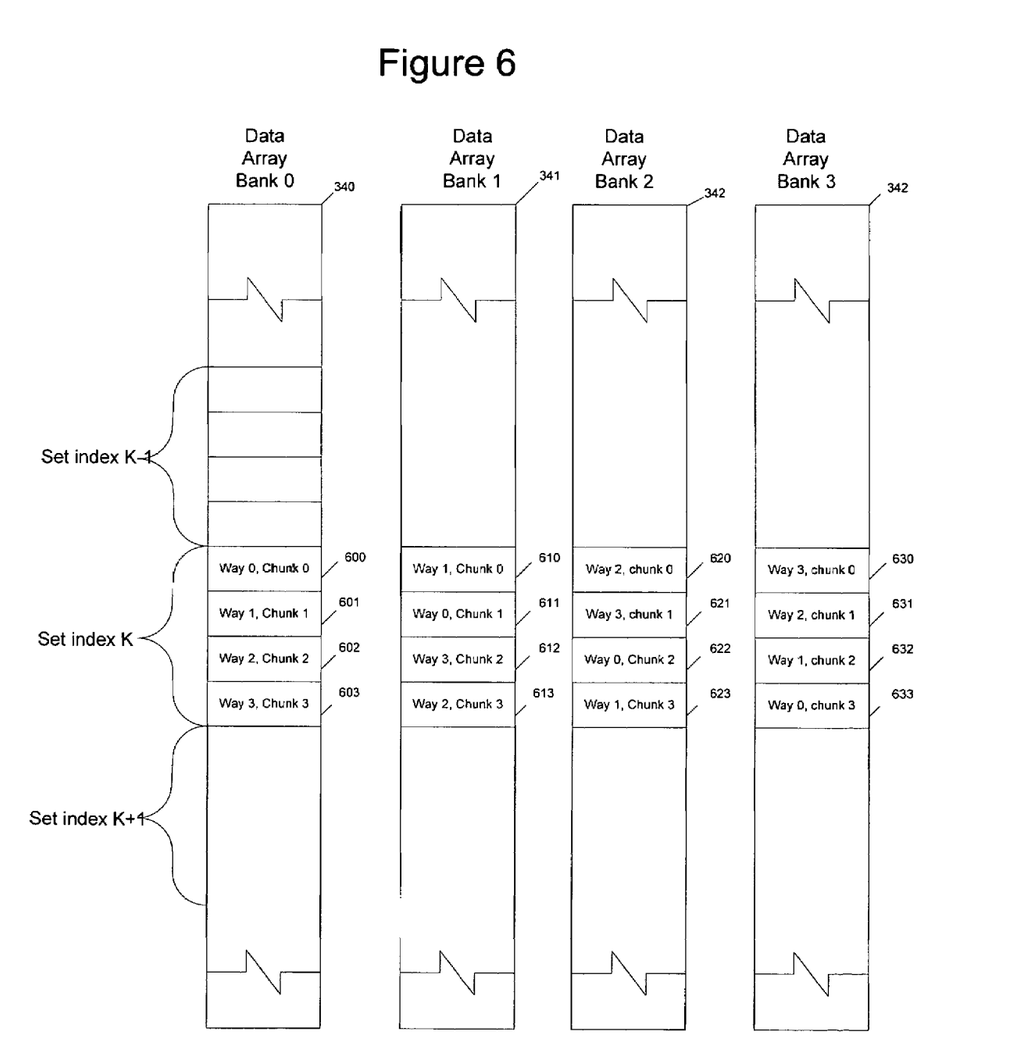
FIG. 6 illustrates a memory map showing an exemplary distribution of chunks and ways in accordance with the present invention.

FIG. 6 is a memory map showing the permutation of ways and chunks for a particular set index for the embodiment of FIG. 2. As noted above, each data array bank 340, 341, 342, 343 is wide enough to store one chunk. If the set index 171 has s bits, then each data array bank can store $2^{s+2}$ chunks. There are 4 chunks associated with a particular value of the set index for a particular way. There are 4 ways. Thus, for a particular value of the set index, the 4 data array banks together must accommodate 16 way-chunk combinations in the locations 600, 601, 602, 603, 610, 611, 612, 613, 620, 621, 622, 623, 630, 631, 632, 633. The embodiment of the braid function and unbraid function shown above permute these 16 way-chunk combinations as shown.

Note that the permutation shown in FIG. 6 puts chunks with chunk index c for each way in a distinct data array bank. Thus a narrow read operation looking for a chunk with chunk index 0 will be able to retrieve 4 distinct candidates simultaneously—one from each data array bank. Also note that the permutation shown in FIG. 6 places each chunk for a particular way in a distinct bank. Thus, when performing a wide read, or evicting a cache line, for a particular way, all of the chunks for that cache line can be extracted simultaneously.

In another embodiment, the arguments of the unbraid function are interpreted as integers and the unbraid function is given by:

unbraid(way_hit, chunk_index)=(way_hit+chunk_index) % N, where "+" indicates addition and "%" indicates the modulus operation. The corresponding braid function for a narrow read (or load) would be given by braid(bank_index, way, chunk_index, 1)=chunk_index.

For the other operations (e.g. wide read, narrow write, wide write), braid would be given by braid(bank_index, way, chunk_index, 0)=(bank_index−way) % N, where "−" indicates subtraction.

In another embodiment, the arguments of the unbraid function are interpreted as integers and the unbraid function is given by:

unbraid(way_hit, chunk_index)=(way_hit−chunk_index) % N, where "−" and "%" are specified above. The corresponding braid function for a narrow read (or load) would be given by braid(bank_index, way, chunk_index, 1)=chunk_index.

For the other operations (e.g. wide read, narrow write, wide write), braid would be given by braid(bank_index, way, chunk_index, 0)=(way−bank_index) % N, where "−" is specified above.

The present invention permutes the ways and chunks over a number of banks and "rows" in those banks within each set. The braiding and unbraiding functions can be extracted from appropriate permutations at the time the cache system 121 is designed. In particular, consider a function f(w,c) that produces a pair (r,b) where w, c, r and b are each in $\{0, 1, \ldots N-1\}$. (w will denote a way, c will denote a chunk index, r will denote an address row and b will denote a particular bank.) Note that f is a map of N×N to N×N. For convenience in notation, break up f into two functions, fr(w,c), the 'row index function', and fb(w,c), the 'bank index function', where (r,b) =f(w,c)=(fr(w,c), fb(w,c)). The present invention can use any function f where (i) f is 1-to-1 and onto, i.e. f is a 'permutation' of the pairs (w,c); (ii) fb(w,c) is a 1-to-1 and onto function of w for each value of c; and (iii) fb(w,c) is a 1-to-1 and onto function of c for each value of w. The last two constraints on fb(w,c) require that some chunk of each way will be found in a particular bank and that each bank contains a chunk corresponding to each distinct chunk index value. A function f( ) that satisfies the foregoing constraints will be referred to as a 'properly banked way-chunk permutation'.

Given such an f(w,c)=(f_r(w,c), f_b(w,c)), the unbraiding function corresponding to this f is simple—unbraid(w,c)=f_b(w,c).

In the case of a narrow read (or load), the braiding function for a particular bank can be extracted from f by observing that the chunk index is known and that the goal is to read the row in that bank with that chunk index. For convenience in notation, define N functions, $g_c(w)=f_b(w,c)$. Let $g_c^{-1}(i)$ be inverse function of $g_c(w)$, i.e. $i=g_c(w)$ if and only if $w=g_c^{-1}(i)$. Note $g_c^{-1}(i)$ is well-defined because of property (ii) of the properly banked way-chunk permutation function defined above. Therefore, the braid function for bank index i for a narrow read operation is given by $$\text{braid}(i,w,c,1)=f_r(g_c^{-1}(i),c).$$

Note that braid(i,w,c,1) does not depend on w.

In the case of a wide read, wide write, or narrow write, the braiding function for a particular bank can be extracted from f by observing that the way is known and that the goal is to access whatever chunk is in that bank corresponding to the known way. For convenience in notation, define N functions, $p_w(c)=f_b(w,c)$. Let $p_w^{-1}(i)$ be inverse function of $p_w(c)$, i.e. $i=p_w(c)$ if and only if $c=p_w^{-1}(i)$. Note $p_w^{-1}(i)$ is well-defined because of property (iii) of the properly banked way-chunk permutation function defined above. Therefore, the braid function for bank index i for operations other than narrow read is given by $$\text{braid}(i,w,c,0)=f_r(w,p_w^{-1}(i)).$$

Note that braid(i, w, c, 0) does not depend on c.

As an alternate formulation, the braiding and unbraiding functions can be obtained from permutation functions that meet certain constraints. In particular, let w denote a way value, c denote a chunk index, i denote a bank index and L indicate a narrow read (processor load) operation when it is 1 and a wide read, wide write, or narrow write (evict/fill/store, respectively) operation if it is 0. Choose functions u(w,c), b0(i,w) and b1(i,c) that satisfy the following:

1. u(w,c) is a permutation of w for fixed c;

2. u(w,c) is a permutation of c for fixed w;

3. b0(i,w) is a permutation of w for fixed i;

4. b1(i,c) is a permutation of c for fixed i; and 5. u(w,c)=i if and only if b0(i,w)=b1(i,c).

The unbraid function can be obtained directly as unbraid(w, c)=u(w,c). The braid function, braid(i,w,c,L) is b1(i,c) when L is 1 and b0(i,w) when L is 0. Note that one efficient choice for b1(i,c) is b1(i,c)=c. Also note that it is feasible for either of b0 or b1 to be independent of i.

Figure 3:
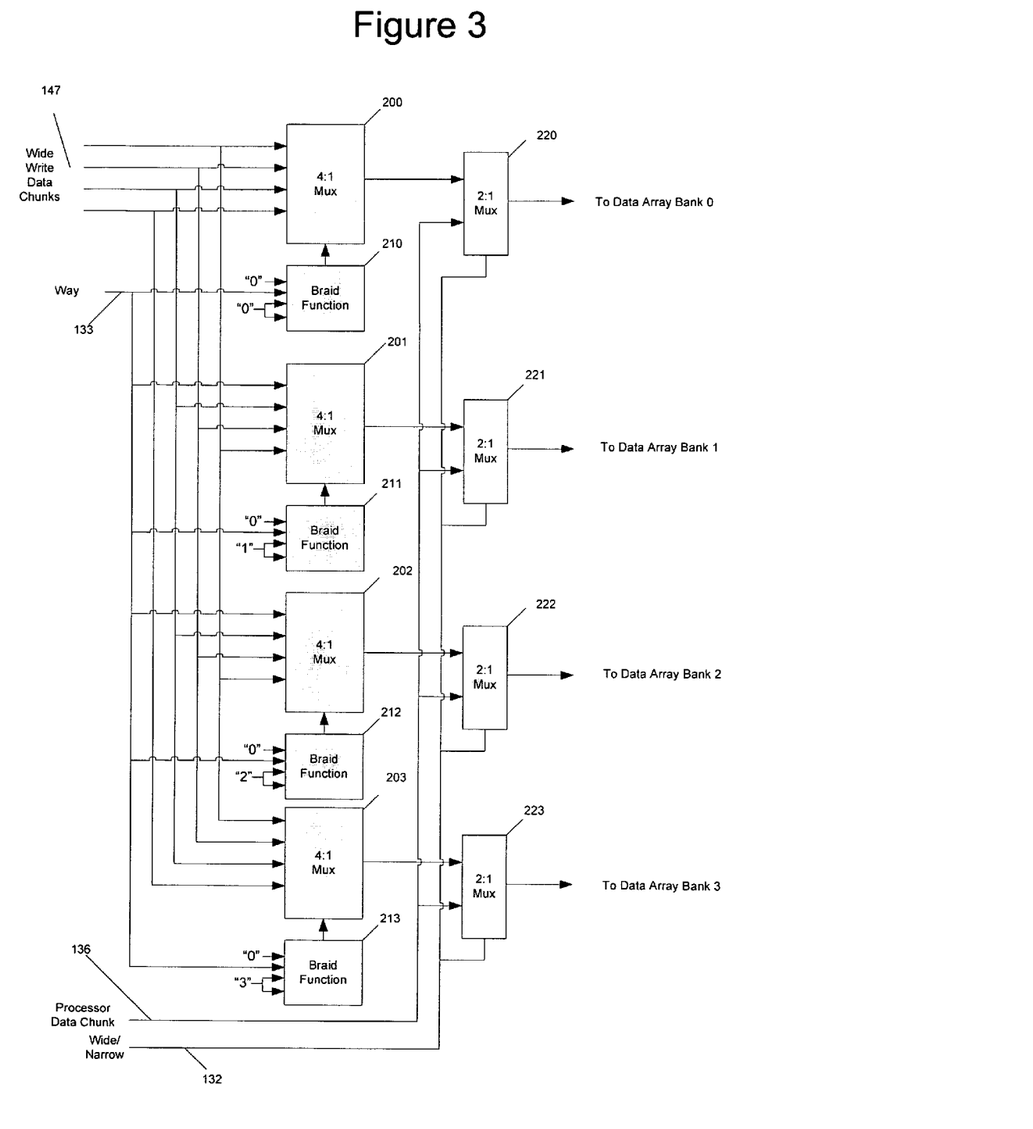
FIG. 3 shows a block diagram of a fill/store data switch that is part of the embodiment of FIG. 2.

FIG. 3 shows an embodiment of the fill/store data switch 370. Multiplexors 200, 201, 202, 203 permute the chunks coming from the memory system 122 on the wide write data path 147 using the braid functions 210, 211, 212, 213. The braid functions 210, 211, 212, 213 are different instances of the braid functions 320, 321, 322, 324, except with different inputs. In particular, each braid function 210, 211, 212 and 213 has the narrow read (load) input tied to "0" because the braiding performed at this stage is for a wide write and not a narrow read. Way 133 is tied to all of the way inputs of braid functions 210, 211, 212 and 213. Braid function 210 has the chunk index input and the bank index input tied to "0". Braid function 211 has the chunk index input and the bank index input tied to "1". Braid function 212 has the chunk index input and the bank index input tied to "2". Braid function 213 has the chunk index input and the bank index input tied to "3".

The second stage multiplexors 220, 221, 222, and 223 select the outputs of the multiplexors 200, 201, 202, 203 for a wide operation (fill/eviction) or put the processor data chunk on each of the data array bank inputs for a narrow (store/load) operation. Note that the output of the fill/store data switch is irrelevant for a narrow read operation.

Figure 4:
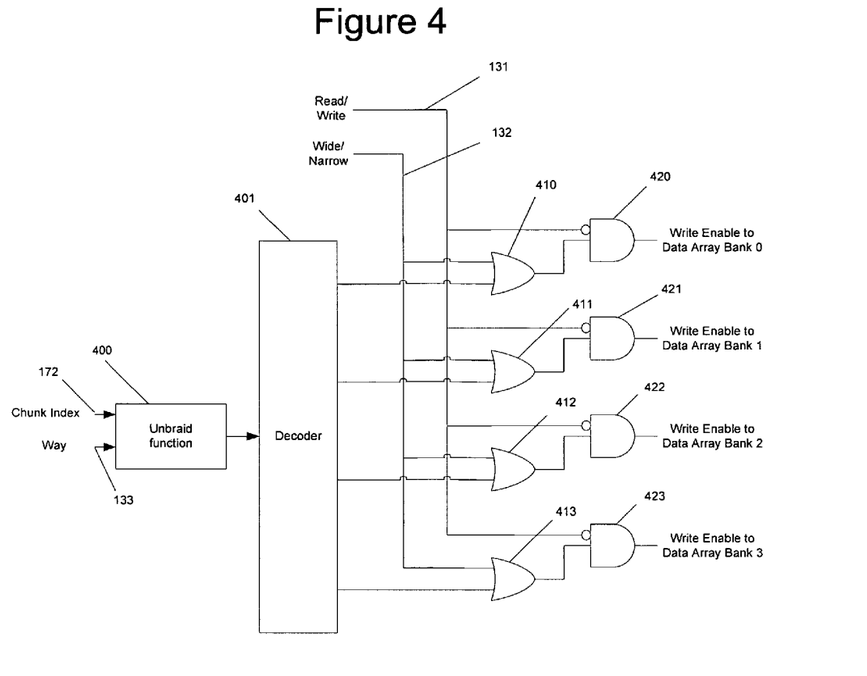
FIG. 4 shows a block diagram of the write enable function that is part of the embodiment of FIG. 2.

FIG. 4 shows an embodiment of the write enable function 350. On a wide write operation (e.g. fill), the write enable is active for all of the data array banks. On any read operation (e.g. eviction, load), the write enable is not active for any data array bank. On a narrow write operation (e.g. store), the write enable is active only for one of the data array banks. The data array bank is selected with unbraid function 400, which is simply a different instance of unbraid function 350. The decoder 401 sets one of its four outputs to "1" and the rest to "0" based on the output of unbraid function 400. Gates 410, 411, 412, 413, 420, 421, 422 and 423 generate the final write enable signal for each bank.

Figure 5:
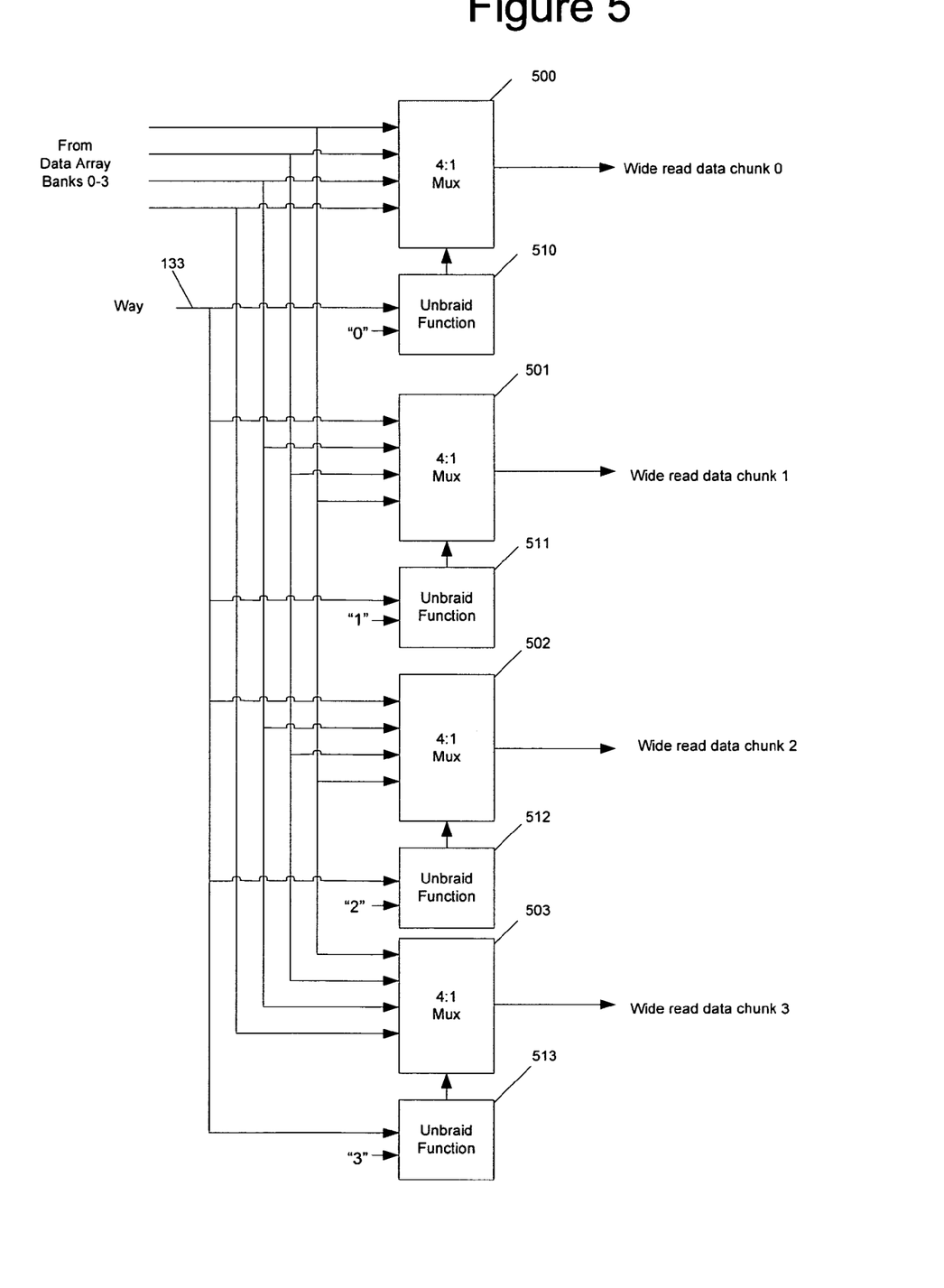
FIG. 5 shows a block diagram of an eviction data switch that is part of the embodiment of FIG. 2.

FIG. 5 shows an embodiment of the eviction data switch 380. The eviction data switch 380 unpermutes the chunks retrieved from the data array banks 340, 341, 342 and 343 with multiplexors 500, 501, 502 and 503. Multiplexors 500, 501, 502, 503 are driven with unbraid functions 510, 511, 512, 513. Unbraid functions 510, 511, 512, and 513 are simply different instances of unbraid function 350. The chunk index input of each unbraid function 510, 511, 512, 513 is set to the constant corresponding to the bank that it is driving, e.g. unbraid function 510 has its chunk index set to "0".

Figure 7:
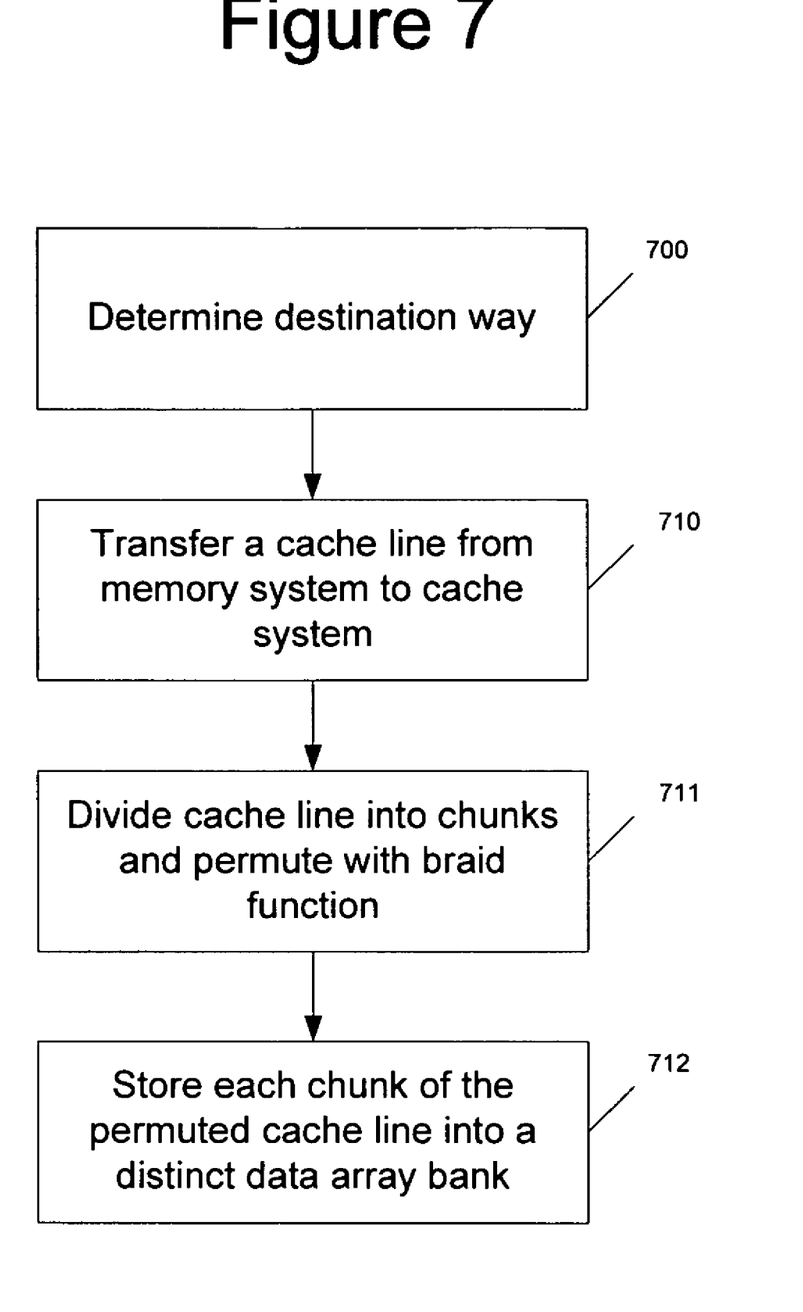
FIG. 7 shows a block diagram of a method of filling the cache with a cache line from the memory system in accordance with the present invention.

FIG. 7 shows the process of filling a cache line using a wide write operation. In step 700, the processor determines the starting address of the cache line and the way to be used in cache system 121. In step 710, the cache line is retrieved from memory system 122. In step 720, the cache line is permuted in accordance with the braid functions. Each chunk of the permuted cache line is stored in a separate data array bank in step 730.

Figure 8:
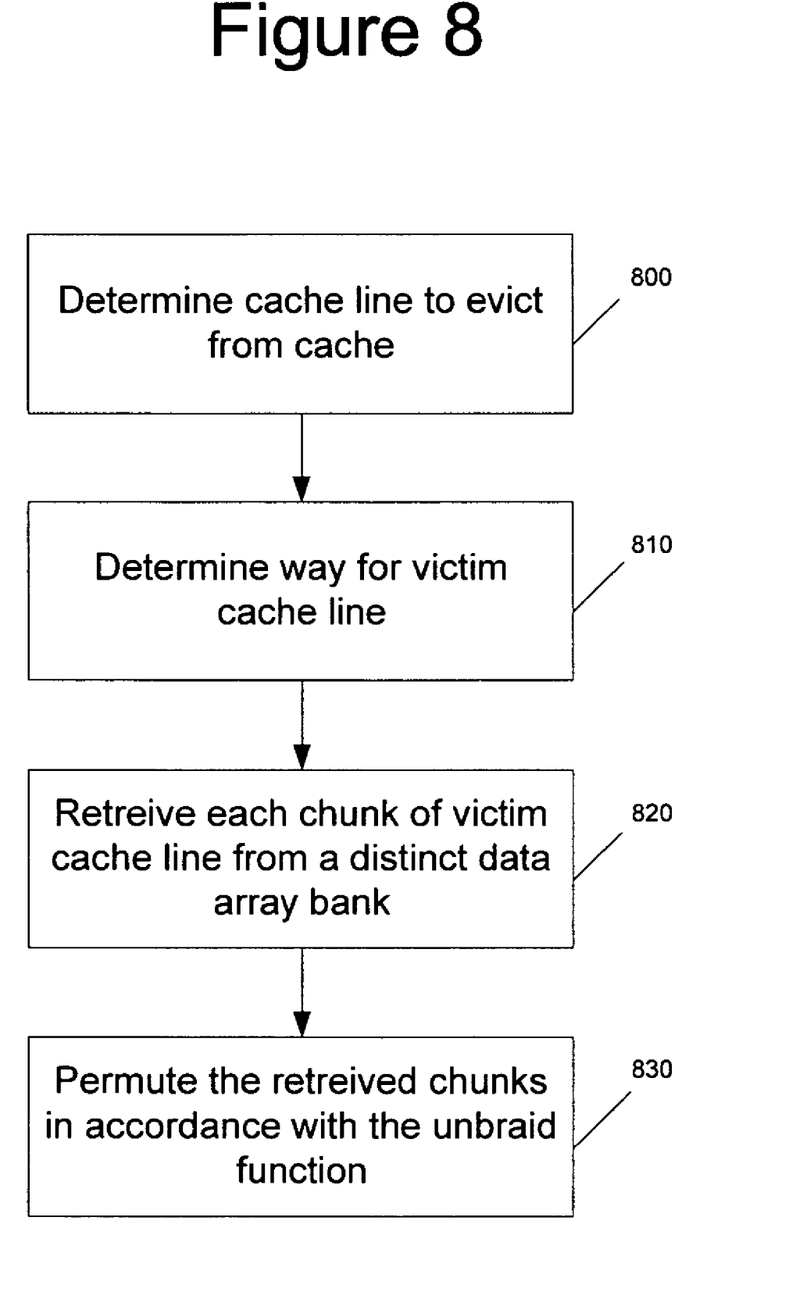
FIG. 8 shows a block diagram of a method of evicting a cache line from the cache system to the memory system in accordance with the present invention.

FIG. 8 shows the process of evicting a cache line from the cache system 121 using a wide read operation. In step 800, the processor 120 determines which cache line to evict, which will here be referred to as the "victim" cache line. In step 810, the processor 120 determines the way of the victim cache line. In step 820, the cache system retrieves chunk of the cache line from a distinct bank. The chunks are then rearranged using the unbraid function in step 830 to form the final cache line.

Figure 9:
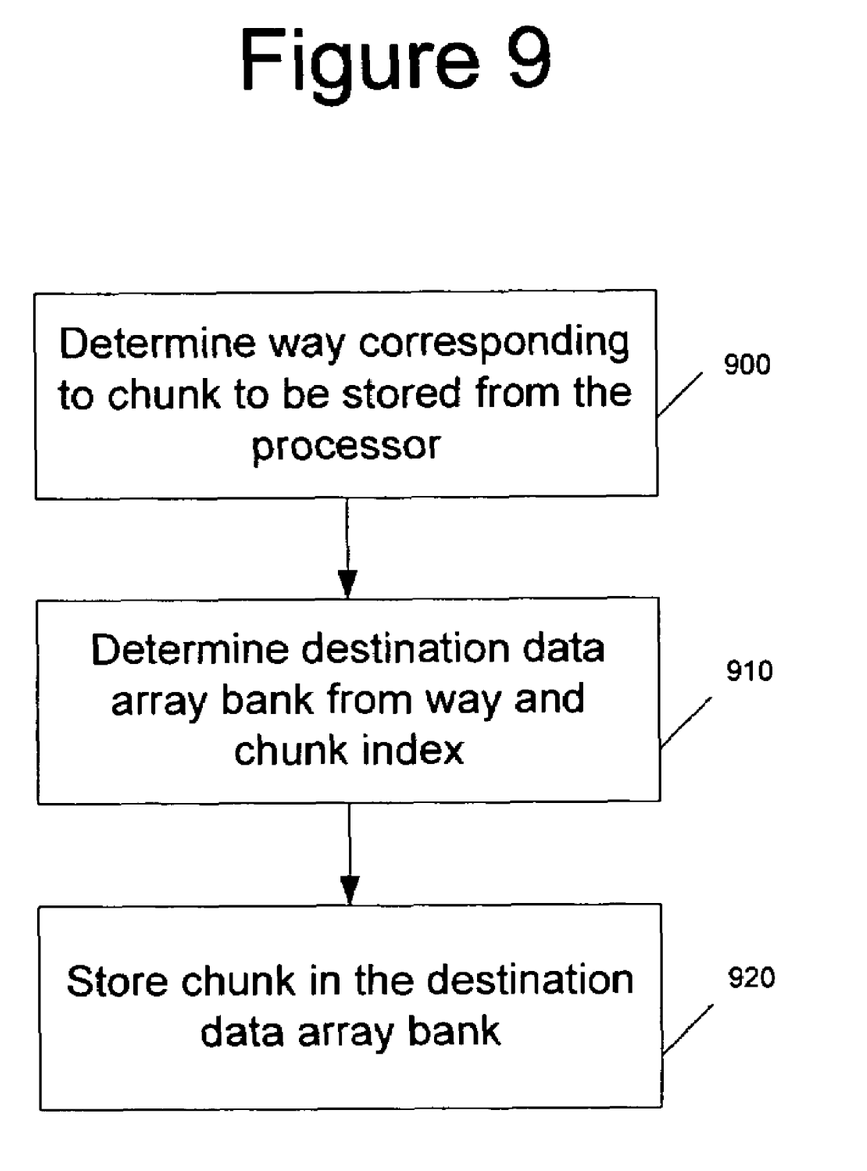
FIG. 9 shows a block diagram of a method of storing a chunk of data from the processor into the cache system in accordance with the present invention.

FIG. 9 shows the process of storing a chunk from the processor 120 into the cache system 121 using a narrow write. In step 900, the processor determines the way for the chunk to be stored. The destination data array bank is determined from the way and the chunk index in step 910 using the braid function. The chunk is stored in the destination data array bank in step 920.

Figure 10:
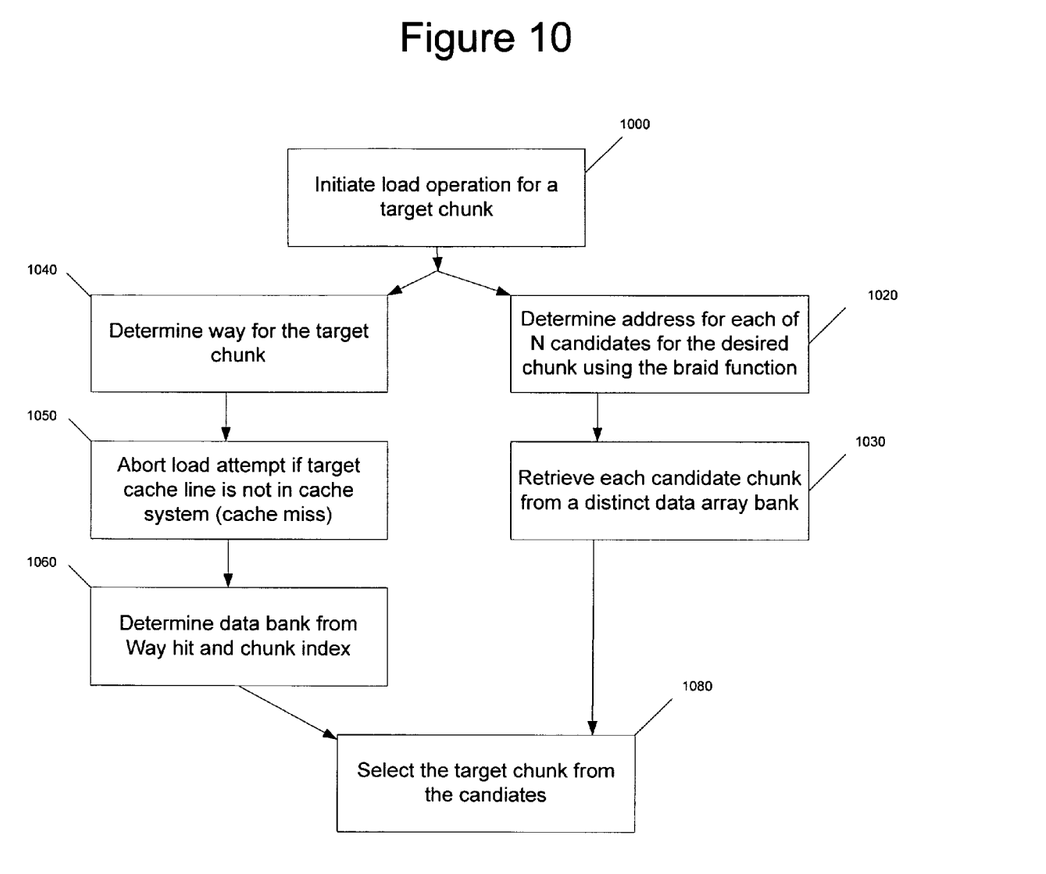
FIG. 10 shows a block diagram of a method of loading a chunk of data from the processor into the cache system in accordance with the present invention.

FIG. 10 shows the process of retrieving a target chunk from the cache system 121. In step 1000, the processor 120 initiates the load operation by specifying a target address. The cache system 121 performs steps 1040 and 1050 in parallel with steps 1020 and 1030. In step 1040, the cache system 121 determines the way hit which indicates the way that is associated with cache line containing the target chunk, if the cache line containing the target chunk is actually in the cache system 121. In step 1050, the load attempt is aborted if the target chunk is not actually in the cache system 121. This is a cache miss that the processor handles in accordance with conventional techniques. In step 1060, the data array bank containing the way hit is determined with the unbraiding function using the way hit and the chunk index.

The actual transfer of a particular requested chunk from memory system 122 through to the processor 120 is a sequence of the processes of FIG. 7 and FIG. 10. First, an attempt to load the requested chunk (or another chunk that would be in the same cache line as the requested chunk) through the process of FIG. 10 results in a miss. The processor 120 initiates the cache fill of the process shown in FIG. 7. In one embodiment, after the cache fill is complete, the processor initiates the load process of FIG. 10. In another embodiment, the cache fill process of FIG. 7 itself initiates the load process of FIG. 7. In an alternate embodiment, the cache fill process of FIG. 7 would deliver the requested chunk to the processor 120 through an additional by-pass data path and the process of FIG. 10 would then be used on subsequent loads directed towards that cache line.

In step 1020, the address for the candidate chunks is computed using the braid function. In step 1030, one candidate chunk is retrieved from each of the data array banks using the address computed in step 1020. In step 1080, the target chunk is selected from the candidates using the result of step 1060.

The present invention could also be used as a second level cache or as an instruction or data cache. It could be on a single chip or implemented over multiple chips. It could be a compiler managed cache, hardware cache, main memory, system memory or the like. It could be used for physical addresses or virtual addresses.

The present invention could also have pipeline stages inserted to increase throughput. The present invention could also be used to handle cache lines with kN chunks by using the present invention sequentially k times.

In one embodiment, the braiding or unbraiding functions could be constructed with a tri-state cross point switch. One such tri-state cross point switch is described in U.S. patent application Ser. No. 11/479,618, entitled "Cross Point Switch," filed Jun. 30, 2006, by R. Masleid and S. Pitkethly, and assigned to Transmeta Corporation, which is incorporated herein by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of retrieving a requested chunk corresponding to a requested address from an N-way set associative cache with said set associative cache comprising N data array banks and a cache line comprising the requested chunk and N–1 other chunks said method comprising:
    filling said N-way set associative cache with the cache line wherein said filling comprises storing each chunk of said cache line into a distinct data array bank using a braiding function, wherein
        each cache line is indexed with a chunk index;
        each cache line shares a common set index;
        each cache line has a distinct way; and
        said N data array banks store said N cache lines of N chunks at locations corresponding to the common set index where (i) each data array bank holds N chunks with distinct chunk index values; and (ii) each data array bank holds a chunk from each cache line;
    retrieving from each data array bank a candidate chunk corresponding to a distinct way; and
    selecting the requested chunk from the retrieved candidate chunks using an unbraiding function.

2. The method of claim 1 wherein said retrieving occurs in each data array bank concurrently.

3. The method of claim 1 wherein said storing occurs concurrently.

4. The method of claim 1 wherein N is 2.

5. The method of claim 1 wherein N is 4.

6. The method of claim 1 wherein N is 8.

7. The method of claim 1 further comprising said N-way set associative cache producing a way hit signal from a first portion of said requested address and wherein said selecting is based on a function of said way hit signal and a second portion of said requested address.

8. The method of claim 7 wherein said function is a bitwise exclusive OR.

9. The method of claim 7 wherein said function is a modulus sum of said inputs.

10. The method of claim 7 wherein said function is a modulus difference of said inputs.

11. The method of claim 1 wherein said cache line further comprises an additional N chunks and said filling step is repeated for said additional N chunks.

12. An N-way set associative cache supporting a properly banked way chunk permutation function, the N-way set associative cache comprising:
- N data array banks each comprising an address input and a data output;
- N braiding functions derived from the properly banked way chunk permutation function with each braiding function coupled to one of the address inputs;
- a multiplexor coupled to each of the data outputs and comprising a selection input; and
- an unbraiding function derived from the properly banked way chunk permutation function and coupled to the selection input.

13. An N-way set associative cache with an address input comprising a chunk index, the N-way set associative cache comprising:
- a way hit signal;
- a load multiplexor comprising a selection input;
- an unbraiding function with the chunk index and the way hit signal as inputs and producing an output to the selection input; and
- N data array banks with each comprising a data output that is coupled to the load multiplexor.

14. The N-way set associative cache of claim 13, wherein the unbraiding function is a bitwise exclusive OR of the inputs.

15. The N-way set associative cache of claim 13, wherein the unbraiding function is the modulus sum of the inputs.

16. The N-way set associative cache of claim 13, wherein the unbraiding function is the modulus difference of the inputs.

17. The N-way set associative cache of claim 13, wherein each data array bank further comprises an address input and further comprising:
- N braiding functions derived from the unbraiding function with each braiding function coupled to the address input of one of the corresponding data array banks.

18. The N-way set associative cache of claim 17, wherein the unbraiding function output is a bitwise exclusive or of the inputs.

19. The N-way set associative cache of claim 17, wherein the unbraiding function is the modulus sum of the inputs.

20. The N-way set associative cache of claim 17, wherein the unbraiding function is the modulus difference of the inputs.

21. An N-way set associative cache, comprising:
- N cache lines of data each comprising N chunks stored using a braiding function wherein:
  - each cache line is indexed with a chunk index;
  - each cache line shares a common set index; and
  - each cache line has a distinct way;
- N data array banks storing the N cache lines of N chunks at locations corresponding to the common set index where (i) each data array bank holds N chunks with distinct chunk index values; and (ii) each data array bank holds a chunk from each cache line.

22. A caching method comprising:
- a means for braiding data over N banks of an N-way set associative cache; and
- a means for outputting unbraided data from said cache.

23. The method of claim 22, wherein said means for braiding data permutes a cache line of data where (i) each data array bank of said cache line holds N chunks of data with distinct chunk index values, and (ii) each data array bank holds a chunk from each cache line, wherein N cache lines of data each comprise N chunks, each cache line is indexed with a chunk index, each cache line share a common set index and each cache line has a distinct way.

24. The method of claim 22, wherein said means for braiding data shuffles a way and chunk index of said cache line of data to distribute chunks belonging to a particular way across each data array bank of said cache and to put chunks with a same chunk index but belonging to a different way in different data array banks.

25. The method of claim 22, wherein said means for braiding data permutes the ways and chunks over said N banks and rows in those N banks within each set.

26. The method of claim 22, wherein said means for braiding data is a function of a bank index, a chunk index, a way, and a type of cache operation.

27. The method of claim 22, wherein said means for unbraiding data is a function of a way hit indication and a chunk index.

* * * * *